United States Patent
Rajabali et al.

[11] Patent Number: 5,913,637
[45] Date of Patent: Jun. 22, 1999

[54] AUTOMATIC PIPELINE PIG LAUNCHING SYSTEM

[75] Inventors: Ashraf Nazarali Rajabali; Robert Darryl West, both of Calgary, Canada

[73] Assignee: Opsco Energy Industries Ltd, Calgary, Canada

[21] Appl. No.: 08/867,124

[22] Filed: Jun. 2, 1997

[30] Foreign Application Priority Data

Feb. 6, 1997 [CA] Canada ................................. 2196965

[51] Int. Cl.$^6$ .............................. F16L 1/04; B08B 1/00
[52] U.S. Cl. ................... 405/169; 15/104.062; 137/268; 405/158
[58] Field of Search .................................. 405/169, 170, 405/171, 158; 15/104.062; 137/268

[56] References Cited

U.S. PATENT DOCUMENTS

| 2,953,157 | 9/1960 | Osborne et al. |
|---|---|---|
| 3,169,263 | 2/1965 | Eagleton ............................. 15/104.062 |
| 3,218,659 | 11/1965 | Rowley ............................... 15/104.062 |
| 3,232,090 | 2/1966 | Walker ................................ 137/268 X |
| 3,404,421 | 10/1968 | Surber ................................ 15/104.062 |
| 3,543,324 | 12/1970 | Knapp et al. ...................... 15/104.062 |
| 3,678,730 | 7/1972 | Barrett, Jr. |
| 3,779,270 | 12/1973 | Davis ....................................... 137/268 |
| 3,906,576 | 9/1975 | Knapp et al. |
| 4,135,949 | 1/1979 | Reese ......................................... 134/18 |
| 4,268,932 | 5/1981 | Hogan ................................ 15/104.062 |
| 4,401,133 | 8/1983 | Lankston |
| 4,457,037 | 7/1984 | Rylander ........................... 15/104.062 |
| 4,709,719 | 12/1987 | Littleton et al. ........................ 137/268 |
| 4,736,482 | 4/1988 | Lankston .......................... 15/104.062 |
| 4,793,016 | 12/1988 | Valentine et al. ................. 15/104.062 |
| 4,850,270 | 7/1989 | Bronnert |
| 4,984,322 | 1/1991 | Cho et al. |
| 5,095,988 | 3/1992 | Bode ................................... 166/70 X |
| 5,139,576 | 8/1992 | Davis |
| 5,277,248 | 1/1994 | Breland ..................................... 166/70 |

*Primary Examiner*—Dennis L. Taylor
*Attorney, Agent, or Firm*—Ryan Kromholz & Manion

[57] ABSTRACT

A remotely actuable launching system for inserting pigs into a pipeline includes a barrel that can accommodate a series of pigs end-to-end. The pigs are urged towards the forward end of the barrel where they are controlled by a pair of axially spaced actuators for release one at a time into the pipeline. Operation of the actuators is effected by a control system using high pressure nitrogen gas and which can be remotely operated to effect launching of a pig into the pipeline at any desired time, without the need for personnel to be on-site.

13 Claims, 2 Drawing Sheets

AUTOMATIC PIPELINE PIG LAUNCHING SYSTEM

BACKGROUND OF THE INVENTION a) Field of the Invention

This invention relates to a new or improved launching system for introducing pigs into a pipeline.

b) Description of the Prior Art

Pipeline cleaning pigs and launching systems for inserting pigs into pipelines have been known for many years, examples being shown in U.S. Pat. No. 3,543,324 Knapp et al and U.S. Pat. No. 5,139,576 Davis.

SUMMARY OF THE INVENTION

The present invention relates to a new or improved pig launching system that is specifically designed to accommodate a plurality of pigs which can be inserted into the pipeline at desired periodic intervals automatically without requiring the presence of personnel at the pig launching site.

More specifically, the invention provides a launching system for introducing pigs into a pipeline, said system comprising: a tubular barrel having an outlet end for communication with said pipeline and sized to accommodate a series of pigs end-to-end therein, said pigs having a diameter corresponding to that of the pipeline; a pig release mechanism selectively operable to release said pigs one at a time into the pipeline, said release mechanism comprising: first and second actuators spaced axially of said barrel, said pigs having a length corresponding to such spacing, each said actuator having a blocker that is movable from an extended position within the said barrel wherein it prevents passage of a pig, to a retracted position; said second actuator being positioned to control release of a foremost one of said pigs into the pipeline; said first actuator being located in said barrel upstream of said second actuator such that its blocker when extended is effective to retain the second and subsequent pigs in the barrel when the blocker of the second actuator is retracted to release the foremost pig; said system including control circuitry or operating said first and second actuators to ensure that when the blocker of said second actuator is retracted, the blocker of said first actuator is in its extended position; said control circuitry being operable in response to a control signal to actuate said launching system at any desired time to release the foremost pig into the pipeline; and wherein said actuators are connected through said control circuitry to be driven by the power of a high pressure gas.

The first and second actuators form a gating arrangement which operates reliably to release one pig at a time. The barrel which preferably has an internal diameter slightly larger than that of the pipeline, can be sized to accommodate as many pigs as desired, so that the pig launching system can be left unattended for lengthy periods, which is a considerable advantage since it will typically be installed at a remote location along a pipeline. The launching system will require only periodic maintenance and reloading of the barrel with fresh pigs.

Various types of actuators are feasible and these may be mechanically, electronically or hydraulically operated. Preferably the actuators are configured to derive their motive power from a source of a dry pressurized gas such as nitrogen.

The blocker of each actuator may comprise a spring-loaded plunger that is sealingly guided in a cylinder and biased by a spring to project into the barrel. One end of the cylinder has an opening through which the plunger passes to the interior of the barrel whereas the other end of the cylinder defines a seat carrying a compression spring which acts to urge the plunger to its extended position. The plunger is retracted by pressurized gas delivered to a chamber wherein it acts upon a piston that carries the plunger. A flow restrictor is preferably used to limit the flow rate of gas into the chamber so that the piston is not moved too quickly. A vent valve is selectively operable to vent the chamber whereupon the spring force acts to extend the plunger into the barrel.

For large diameter pigs, each actuator may include a pair of plungers which operate simultaneously and which enter the barrel from opposite sides.

Some prior pig launching systems for their operation utilize the pressure of the gas or other fluid being conveyed in the pipeline. The system according to the invention preferably uses on a gas source that is independent from the pipeline and can operate under virtually any pipeline conditions, whereas the aforesaid prior systems of course cannot operate when the pipeline pressure is low or nonexistent.

When used at locations which are subject to low temperatures, the high pressure gas should be dry to avoid problems which would otherwise be created by freezing of water in the mechanism. Preferably the gas should also be non-reactive, readily available, and relatively inexpensive. Nitrogen gas is widely available and inexpensive, and is a suitable gas for use as the high pressure gas in the present invention.

BRIEF DESCRIPTION OF THE DRAWINGS

The invention will further be described, by way of example only, with reference to the accompanying drawings wherein.

DESCRIPTION OF THE PREFERRED EMBODIMENTS

Figure 1:
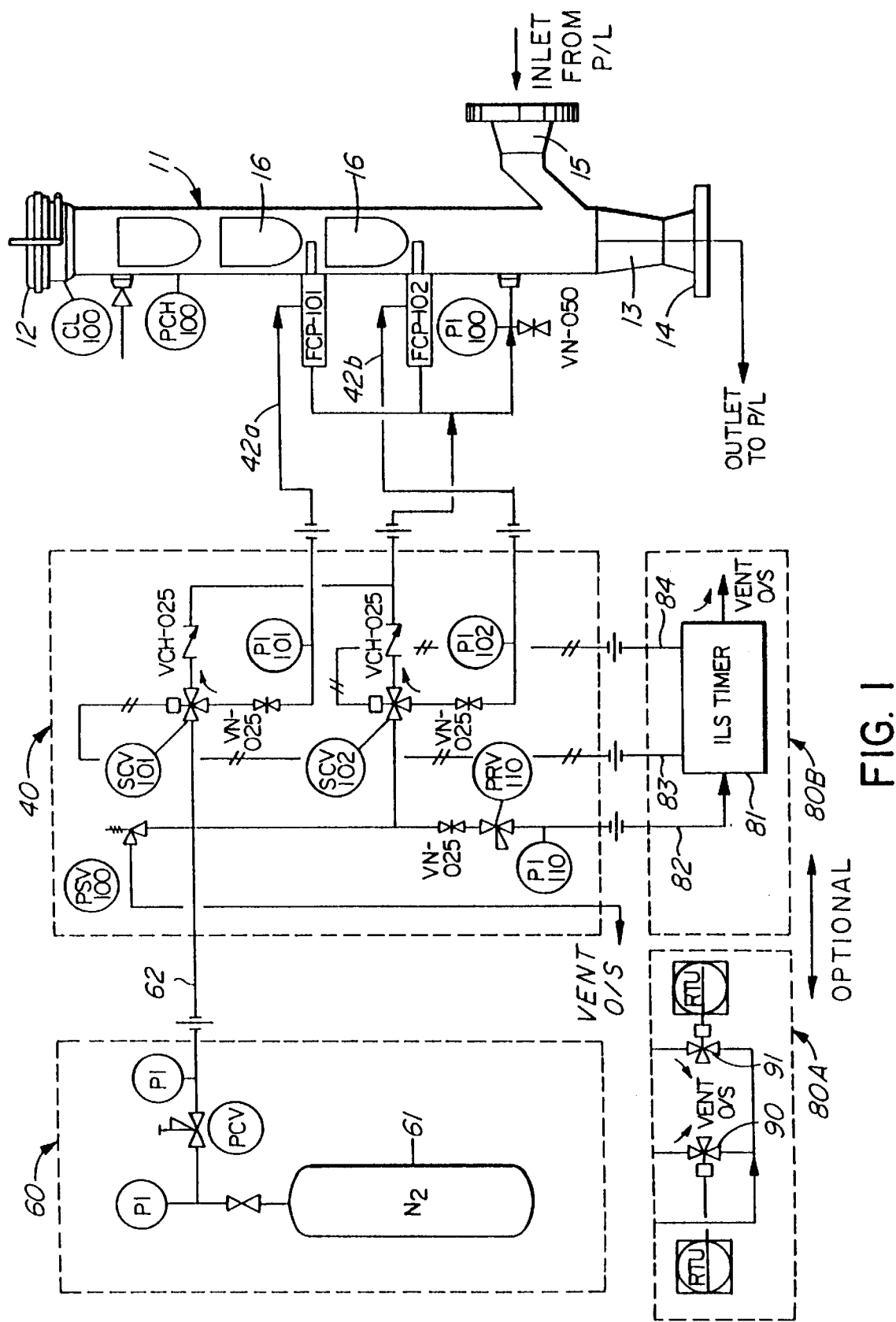
FIG. 1 is a schematic view illustrating a presently preferred embodiment of the pig launching system according to the invention.

The pig launching system shown in FIG. 1 comprises a pig barrel 11 arranged generally vertically and having at its upper end a removable closure 12. The lower end of the barrel 11 has a tapered reducer section 13 leading to a flanged (or threaded) outlet 14 for connection to the pipeline (not shown). The lower end of the barrel 12 also communicates with the pipeline through a flanged (or threaded) inlet connection 15 which projects laterally just above the tapered section 13, so that the pipeline flow passes through the lower end of the barrel from inlet 15 to outlet 14. Above the inlet 15 the barrel 11 forms a storage zone to accommodate a series of pipeline pigs 16, which are shown only schematically, and it will be understood that the length of the barrel can be chosen to accommodate whatever number of pigs is desirable. The pigs 16 (which will be more fully described later) are sized to match the internal bore of the pipeline and are accommodated with some radial clearance within the barrel 11.

Release of pig 16 into the pipeline is performed by a pair of actuators FCP-101 and FCP-102 carried on the barrel 11 at longitudinally spaced locations. The structure of the actuators will be more clearly evident from a consideration of FIG. 2 which shows a longitudinal sectional view of one. The actuator comprises a cylinder 20 mounted radially on the barrel wall 11 in register with an opening 21 therein by a collar 22. The rear end of the cylinder has a cap 23 defining an axial vent port 24. A piston 25 is guided for axial movement in sealing engagement with the cylinder wall, the piston having at its rear end an axially extending stem 26 and at its forward end an axially extending rod 27. The stem 26 is partially surrounded by a coiled compression spring 28 one end of which is engaged against the piston 25 and the opposite end of which presses against an annular seat 29 carried in the cap 23.

Figure 2:
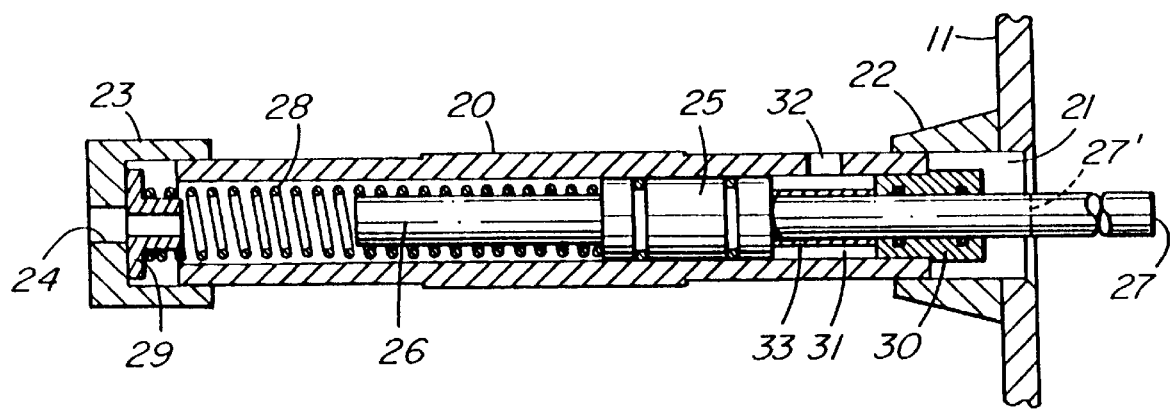
FIG. 2 is an enlarged sectional view showing a portion of the system.

The piston rod 27 extends through a sealing gland 30 at the front end of the cylinder, the sealing gland defining the forward end of a chamber 31 that surrounds the piston rod, the chamber being accessible through a port 32. As will be appreciated, the piston 25 is movable axially within the cylinder 20, the forward limit in the range of movement being defined by a sleeve 33 surrounding the rod 27 and forming an abutment between the piston 25 and the gland 30. In the advanced position of the piston 25 as shown in FIG. 2 the piston rod 27 projects a considerable distance into the interior of the barrel 11 and in this extended position acts as a blocker to prevent passage of pigs along the barrel, as will be more fully described later on. In the retracted position as indicated by the broken line 27' in FIG. 2, the piston rod 27 does not project significantly into the barrel.

The actuators FCP-101 and FCP-102 are operated to control release of the pigs 16 into the pipeline at selected intervals, this being effected by a pneumatic control system indicated by the broken line 40 in FIG. 1, this system being powered by the stored energy of a high pressure gas supply indicated by the broken line 60 and initiated by a trigger unit of which two forms are illustrated by the broken lines 80A and 80B in FIG. 1.

The high pressure gas supply includes a container 61 of high pressure nitrogen which is delivered through a pressure regulator PCV and a line 62 to the pneumatic control system 40. The high pressure nitrogen is delivered to two signal control valves SCV-101, SCV-102, each of these comprising a three way pneumatical control valve through which high pressure gas can be delivered via respective lines 42A, 42B to the respective inlet port 32 of the cylinders. In each of the lines 42A and 42B there is a needle valve VN-025 which limits the flow of nitrogen therein. The vent ports 24 of the cylinders are connected to a vent line 44 which communicates with the interior of the barrel, which will be at the pipeline pressure which will be lower than the system pressure.

In a second position of each of the signal control valves SCV-101 and SCV-102 the respective line 42A, 42B is communicated to the vent line 44, there being respective check valves VCH-025 to prevent discharge from one actuator affecting the other.

Initiation of the pneumatic control system is effected by either of the trigger units 80A, 80B shown in FIG. 1. The unit 80B comprises an ILS timer 81 which is designed to deliver low pressure (60 psi) signals selectively to the signal control valve SCV-101 or SCV-102 thereby controlling operation of the related actuators FCP-101, FCP-102 respectively. The timer 81 is connected to the control valves SCV-101, SCV-102 through lines 83 and 84 respectively.

The ILS timer 81 is powered by a low pressure nitrogen supply delivered through a line 82 from the high pressure nitrogen source through a pressure regulator PRV-110. In the inoperative position, in each of the actuators FCP-101 and FCP-102 the piston rod 27 is maintained in its projected advanced position by the force of the spring 28. When now a low pressure signal is delivered from the timer 81 through line 83 to the normally closed signal control valve SCV-101, this valve is opened to deliver a flow of high pressure nitrogen via the line 42a to the actuator FCP-101, thus "arming" the system by allowing one of the pigs 16 to advance into the empty space in the barrel between the two actuators, movement of the pig being arrested by the extended piston rod 27 of the second actuator FCP-102. The pig (and any following pigs in the barrel) advances under the weight of gravity. During this arming phase nitrogen flow through the line 42a is controlled by the needle valve VN-025 to prevent excessive speed of movement of the piston 25. The pressure signal in the line 83 is maintained for a sufficiently long time (e.g. one minute) to ensure that the desired operations have occurred and is then terminated. When loss of this signal the control valve SCV-101 returns to its closed position wherein the supply of high pressure nitrogen is cut off, and the line 42a is connected to the vent line 44. Upon venting of the high pressure nitrogen from the chamber 31 the piston 25 will be restored to its advanced position by the pressure of the spring 28, with any undesirable backflow into the other piston chamber being prevented by a check valve VCH-025 in the vent line.

It will be understood that in this "armed" condition there will be a pig 16 in the barrel between the two actuators, and the second and any subsequent pig will be restrained from advancing by the extended piston rod 27 of the actuator FCP-101.

The trigger unit is designed to allow a suitable interval (e.g. one minute) to elapse before taking further action to launch a pig into the pipeline. When this interval has elapsed the timer 81 will operate to provide a low pressure (60 psi) signal via line 84 to the control valve SCV-102 which will be opened to deliver high pressure nitrogen through the line 42b to the actuator FCP-102 (at a flow rate that is modulated by the needle valve VN-025) to retract its piston rod 27 allowing the foremost pig 16 to drop freely in the barrel and enter the pipeline through the tapered reducer 13 in the outlet 14. The momentum of the pig will carry it into the pipeline flow (passing between the inlet 15 and the outlet 14) and the force of this flow will push the pig through the reducer 13 and launch it into the pipeline.

After a suitable interval (e.g. one minute) the low pressure signal through the line 84 is terminated by the timer so that the valve SCV-102 automatically closes cutting off the flow of high pressure gas and venting the line 42b through the check valve VCH-025. Therefore as the chamber 31 is vented, the piston rod 27 of the actuator FCP-102 is moved to its advanced position in the barrel by the force of the spring 28.

It will be appreciated that the cycle described above can be used to release pigs 16 sequentially into the pipeline in accordance with a pre-arranged schedule determined by the timer 81 of the trigger 80A. The timer is a low power electrical timer driven by batteries (e.g. common D-cells) controlling two internal low pressure solenoid valves (not shown) by means of which the low pressure signal is delivered selectively to the lines 83 and 84. The batteries will be long life, e.g. at least one year, and the timer can be scheduled to operate unattended over long periods.

An alternative trigger unit 80A shown in FIG. 1 includes solenoid valves 90, 91 connected to be operated by low power remote signals via receivers RTU which receive signals by e.g. radio, satellite or land line. This arrangement provides the capability of remote operation so that the system can be left unattended for long periods.

It will be understood that the spacing between the actuator FCP-101, FCP-102 is arranged to match the length of the pigs 16, and will vary according to the application. Likewise the form of the piston rod 27 will to some extent be dependent upon the particular type of pig 16 that is employed.

Additional actuators such as FCP-101 can be located at different positions in the length of the barrel 11 to more readily accommodate the system for use with pigs of different lengths. Furthermore, for very large diameter pigs, the actuators FCP-101 and FCP-102 could be duplicated so that at each actual location there are two or more actuators to distribute the load of the pigs and to reduce any tendency for them to tilt.

The extent to which the piston rod is extended into the barrel can be controlled by suitable selection of the length of the sleeve 33 which surrounds the piston rod in front of the piston 25.

From the foregoing description it will be clear that the overall pig launching system can be programmed for remote operation to launch pigs at pre-programmed intervals by use of the timer 81, or in response to remotely generated signals by use of the trigger 80a.

The system can be sized to suit pipelines of various diameters used to transport many different gases and liquids. The pigs should be more dense than the pipeline fluid medium so that they fall or sink into the medium and become entrained thereby.

There is no theoretical limit to the size, shape or quantity of pigs that can be handled by the system. As noted, to deal with larger pigs, the actuators can be duplicated. Further actuators spaced along the barrel can be provided to permit launching of pigs of various lengths.

The use of an external supply of high pressure nitrogen gas rather than the process gas within the pipeline is advantageous since it will prevent freezing of condensing water vapour (or other contaminants present in the pipeline gas) from jamming the pneumatic controls or pistons at low ambient temperatures. Furthermore, by being independent of the pipeline pressure it is possible for the system to operate with extremely low pipeline pressures as well as in pipeline systems carrying liquids such as oil and water.

The net volume of nitrogen used by the system is very small. The high-pressure nitrogen is vented from the actuators to the barrel chamber and thus to the pipeline rather than being vented to the atmosphere, so that the process back-pressure prevents the release of the entire amount of nitrogen from the actuator. Each operating cycle will consume only a small differential pressure needed to overcome the actuator spring. Of course, only very small quantities of gas are utilized in the low pressure control systems of the trigger units. It is envisaged that because of the low consumption, a commercial sully (for example, size 50 bottle, 2640 psig, 305 standard cubic feet) should be able to guarantee operation of the system in a typical installation for a period of at least one year, at a rate of one launch per day.

We claim:

1. A launching system for introducing pigs into a pipeline, said system comprising:
    a tubular barrel having an outlet end for communication with said pipeline and sized to accommodate a series of pigs end-to-end therein, said pigs having a diameter corresponding to that of the pipeline;
    a pig release mechanism selectively operable to release said pigs one at a time into the pipeline, said release mechanism comprising:
        first and second actuators spaced axially of said barrel, said pigs having a length corresponding to such spacing, each said actuator having a blocker that is movable from an extended position within the said barrel wherein it prevents passage of a pig, to a retracted position; each blocker comprising a spring-loaded plunger which is biased by a spring to project into said barrel, said plunger being sealingly guided for axial movement in a cylinder, said plunger when extended projecting through one open end of said cylinder into the interior of said barrel, said cylinder defining with a piston carried on said plunger a closed chamber; each actuator including means for creating a fluid pressure differential across said piston to retract said plunger against the force of the aforesaid spring; said means for creating comprising a conduit for communicating said high pressure gas to said closed chamber to displace said piston and retract said plunger; and a valve selectively operable to vent said chamber, whereupon the pressure of said spring acts to displace said piston and advance said plunger into said barrel;
        said second actuator being positioned to control release of a foremost one of said pigs into the pipeline;
        said first actuator being located in said barrel upstream of said second actuator such that its blocker when extended is effective to retain the second and subsequent pigs in the barrel when the blocker of the second actuator is retracted to release the foremost pig;
    said system including control circuitry for operating said first and second actuators to ensure that when the blocker of said second actuator is retracted, the blocker of said first actuator is in its extended position; said control circuitry being operable in response to a control signal to actuate said launching system at any desired time to release the foremost pig into the pipeline; and wherein said actuators are connected through said control circuitry to be driven by the power of a high pressure gas.

2. A system as claimed in claim 1 wherein said chamber is vented through a restricted orifice to limit the flow rate of gas through to a low level.

3. A system as claimed in claim 1 wherein each actuator incorporates a pair of opposed plungers which enter the barrel on different sides at the same axial location therein.

4. A system as claimed in claim 1 including a remotely actuated trigger mechanism, said trigger mechanism being connected to release a pig into the pipeline when actuated.

5. A system as claimed in claim 1 wherein said trigger mechanism is coupled to a signal receiver for actuation thereby upon receipt of a remotely transmitted signal.

6. A system as claimed in claim 1 wherein said high pressure gas is from a source independent of said pipeline.

7. A system as claimed in claim 1 wherein the blocker of each actuator is spring-loaded and is biased towards said extended position, retraction of said blocker being effected by supplying said high pressure gas to said chamber to displace said piston against the force of the aforesaid spring loading.

8. A system as claimed in claim 7 including a valve selectively operable to vent said chamber whereupon the pressure of said spring acts to displace said piston and advance said blocker into said barrel to said extended position.

9. A system as claimed in claim 8 wherein said chamber is vented through a restricted orifice to limit the flow rate of gas therethrough to a low level.

10. A launching system for introducing pigs into a pipeline, said system comprising: a tubular barrel that is oriented at a steep angle to the horizontal and having an outlet end for communication with said pipeline and sized to accommodate a series of pigs end-to-end therein, said pigs having a diameter corresponding to that of the pipeline; a pig release mechanism selectively operable to release said pigs to drop into the pipeline under the force of gravity alone, said release mechanism comprising: first and second actuators spaced axially of said barrel, each said actuator having a blocker that is movable from an extended position within the said barrel wherein it prevents passage of a pig, to a retracted position; said system including control circuitry for operating said first and second actuators in response to a control signal to actuate said launching system to release the foremost of said pigs into the pipeline; wherein said actuators are connected through said control circuitry to be driven by the power of a high pressure gas from a source independent of the pipeline; and wherein each said actuator comprises a cylinder that is sealingly connected at one end to said barrel, said blocker being carried on a piston rod and movable therewith axially of the cylinder to and from said extended position; said piston rod extending through and being guided by a collar that is fixed in said cylinder; first seal means acting between said piston rod and said collar, said piston rod carrying a piston that is sealingly and axially movable within said cylinder, second seal means acting between said piston and said cylinder, said piston defining with said collar opposite ends of an annular chamber in said cylinder that is in communication with a supply of said high pressure gas, such that said cylinder isolates the interior of said barrel from atmosphere by virtue of both sides of each said first and second seal means being contained within the physical boundary of a system formed by said barrel and said cylinder.

11. A launching system for introducing pigs into a pipeline, said system comprising:

a tubular barrel having an outlet end for communication with said pipeline and sized to accommodate a series of pigs end-to-end therein, said pigs having a diameter corresponding to that of the pipeline, said barrel being oriented at a steep angle to the horizontal;

a pig release mechanism selectively operable to release said pigs to fall solely under the force of gravity and pass into the pipeline, and control circuitry operable in response to a control signal to actuate said pig release mechanism at any desired time to release the lowermost of said pigs from the barrel into the pipeline; and wherein said pig release mechanism is connected through said control circuitry to be driven by the power of a high pressure gas from a source independent of said pipeline.

12. A system as claimed in claim 11 wherein said trigger mechanism is coupled to a signal receiver for actuation thereby upon receipt of a remotely transmitted signal.

13. A system as claimed in claim 11 wherein said high pressure gas is nitrogen.

* * * * *